United States Patent [19]

Mohtasham et al.

[11] Patent Number: 5,184,865
[45] Date of Patent: Feb. 9, 1993

[54] INSECT NETTING FOR BABY STROLLER

[76] Inventors: Mani Mohtasham, 10665 SW.76th Ter.; Hamid Gharagozloo, 7896 SW. 106 Cir., both of Miami, Fla. 33173

[21] Appl. No.: 808,171

[22] Filed: Dec. 13, 1991

[51] Int. Cl.$^5$ .............................................. B60J 7/12
[52] U.S. Cl. .................... 296/77.1; 296/111; 5/416; 135/88; 135/106
[58] Field of Search ............ 296/77.1, 102, 136, 296/111; 135/88, 104, 106; 5/414–416; 160/76, 77, 134, DIG. 18; 150/166

[56] References Cited

U.S. PATENT DOCUMENTS

| | | | |
|---|---|---|---|
| 1,039,993 | 10/1912 | Murphy | 5/416 |
| 1,143,774 | 6/1915 | Nicholls | 296/77.1 X |
| 1,339,527 | 5/1920 | Sperling et al. | 296/77.1 X |
| 1,377,910 | 5/1921 | Munson | 296/77.1 X |
| 1,732,878 | 10/1929 | Collender | 296/136 X |
| 2,129,080 | 9/1938 | Bramnick | 135/88 X |
| 4,582,355 | 4/1986 | Hall | 296/77.1 |
| 4,641,879 | 2/1987 | Kassai | 296/111 X |
| 4,852,598 | 8/1989 | Griesenbeck | 5/414 X |

FOREIGN PATENT DOCUMENTS 0204643  10/1923  United Kingdom ............... 296/77.1

*Primary Examiner*—Dennis H. Pedder
*Attorney, Agent, or Firm*—Malloy, Downey & Malloy

[57] ABSTRACT

A collapsible insect netting, to be used in combination with a baby stroller, the netting being sized and configured to be securely fitted about the stroller, thereby protecting the child within. The collapsible netting assembly includes a collapsible arched enclosure having a top and side panels formed of an open weave fabric, a surrounding skirt adapted to be fitted about the stroller and secure the assembly thereto, a collapsible frame to define the arched enclosure, and a sealable opening to allow quick and easy access to the child within the netting.

7 Claims, 2 Drawing Sheets

INSECT NETTING FOR BABY STROLLER

BACKGROUND OF THE INVENTION

1. Field of the Invention

This invention relates to a portable insect netting assembly adapted to be collapsibly and removably secured to a baby stroller, thereby providing the user with a quick and easy means of protecting a child within the stroller from insect bites, while still facilitating easy access to the child within and quick removal and storage of the assembly when not needed.

2. Description of the Prior Art

Insects, and more particularly biting insects, are highly annoying and may be quite hazardous, especially to small children who may have adverse allergic reactions to insect bites. For this reason, there is a need for an effective means of protecting a child from insect bites. A commonly used protective measure to guard against insects are insect repellent lotions that are applied to one's skin, and whose chemical composition causes insects to stay away. This method, however, is not highly desirable for use on small children, as the lotions may contain toxic chemicals whose fumes may be hazardous to a child and that may be easily ingested by a child prone to putting his or her hands in their mouth. Further, the lotions are messy and bothersome to apply, especially to a small, fidgety child.

Another highly used method of protecting individuals from insects are screened enclosures or window coverings which allow individuals to be outdoors and free from bothersome insects. Generally, these screens are used in a fixed location and are not adaptable to be carried around for individual protection. Since small children are often transported in strollers, and are not quite as mobile in their early stages of development, the applicant has devised a method to protect children which is easily installed and removed, and provides a safe environment for the child. Such an invention is the subject of the present application, and it would solve a long-felt need to protect a child from potentially dangerous insect bites.

SUMMARY OF THE INVENTION

The present invention is directed towards a portable insect netting to be used in combination with a stroller, or independently. The insect netting assembly includes a collapsible arched enclosure having a top panel, a pair of semicircular side panels, a surrounding skirt portion, and an open bottom. The top panel and side panels are formed of a lightweight open weave fabric, and the top panel includes a sealable opening whereby a child within the enclosure may be easily reached. The surrounding skirt is sized to be fitted around the baby stroller, and includes an elastic material strip about its lower peripheral edge which secures the enclosure around the baby stroller. The enclosure maintains its form by collapsible frame means which provide a plurality of supports, thereby defining the area of the enclosure.

It is an object of the present invention to overcome the problem of insect netting for strollers. The invention not only permits the netting to be easily installed or removed with negligible disturbances to a sleeping child in the stroller, but after it has been installed, it is effectively anchored against accidental displacement by an active child in the stroller. Though it will be apparent that the present invention may be used with any type of stroller, it may also be used as an insect netting on a bed, a crib, or on the ground.

BRIEF DESCRIPTION OF THE DRAWINGS

For a fuller understanding of the nature of the present invention, reference should be had to the following detailed description taken in connection with the accompanying drawings, in which.

Like reference numerals refer to like parts throughout the several views of the drawings.

DETAILED DESCRIPTION OF THE PREFERRED EMBODIMENT

As shown in FIGS. 1–14, the present invention is directed towards a portable insect netting assembly, of which the applicant has three embodiments 10, 10', 10''.

Figure 1:
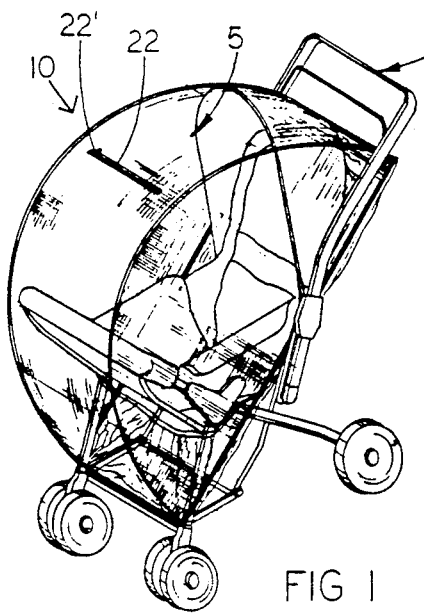
FIG. 1 is a perspective view of a typical stroller fitted with a first embodiment of the insect netting.
Figure 2:
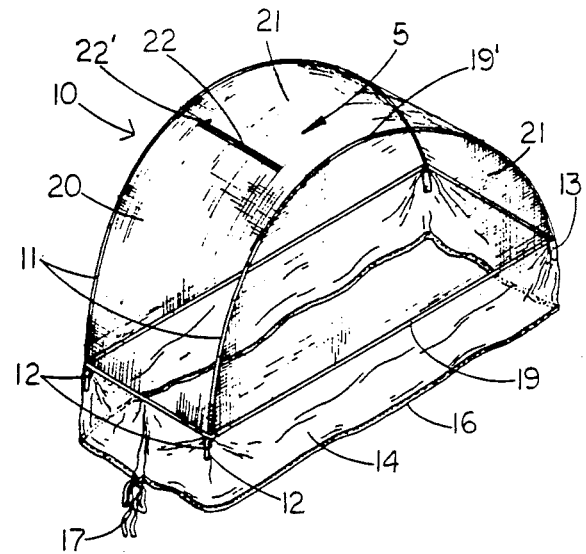
FIG. 2 is a perspective view of the first embodiment of the insect netting in an extended position.
Figure 3:
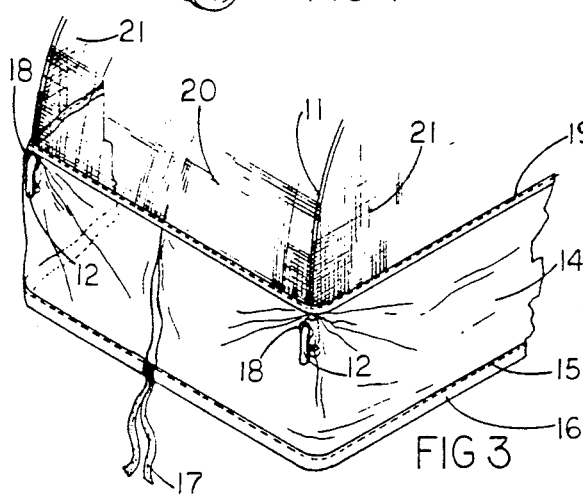
FIG. 3 is a detailed fragmentary front view of the first embodiment of the insect netting.
Figure 4:
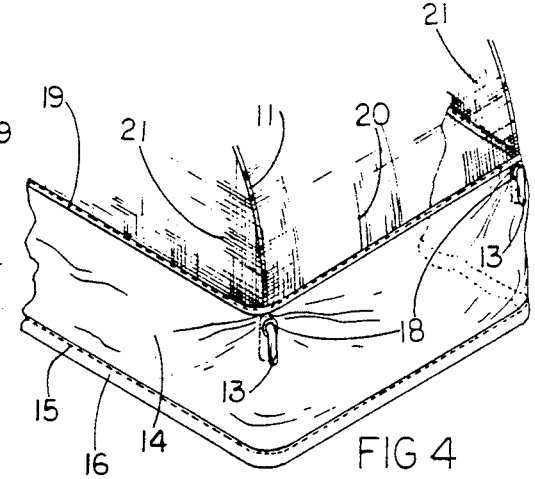
FIG. 4 is a detailed fragmentary rear view of the first embodiment of the insect netting.
Figure 5:
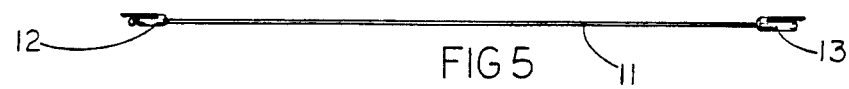
FIG. 5 is a perspective view of the elongated resilient spring rod used in the first embodiment of the insect netting assembly.

Turning to FIG. 1, the first embodiment of the portable insect netting 10 is shown secured to a stroller 50. As detailed in FIG. 2, the insect netting assembly 10 primarily includes a collapsible arched enclosure 5 made up of a top panel 20, a pair of side panels 21, and a surrounding skirt 14. The side panels 21 are generally semi-circular in shape and include a lower straight edge 19, and a rounded peripheral edge 19' which is attached along an edge of the top panel 20. The top panel 20 and the side panels 21 are composed of an open weave fabric which allows free visibility and air flow while keeping insects out. Attached to the peripheral edges of the top panel 20 and side panels 21 is the surrounding skirt 14, which may be made of a flexible sheet of braided nylon. The lower peripheral edge 16 of the surrounding skirt 14 includes a pleated stitch 15 such that an elastic strip 17 may be slidably secured to the surrounding skirt 14, thereby providing a means of tightening the assembly 10 about a baby stroller 50. Defining the shape of the arched enclosure 5 are a pair of spring rods 11, detailed in FIG. 5, which extend along the rounded peripheral edge 19' of the side panels 21. Located at opposite distal ends of the spring rod 11 are U-shaped sockets 12 and 13. As detailed in FIGS. 3 and 4, the U-shaped sockets 12 and 13 are inserted into stopper loops 18 in the surrounding skirt 14, such that the spring rods 11 will securely maintain and define the shape of the arched enclosure 5.

Figure 6:
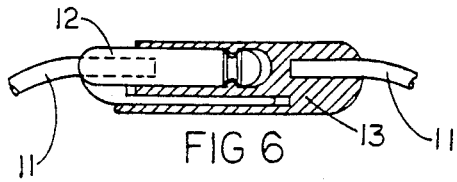
FIG. 6 is a detailed cross-sectional view of opposite ends of the resilient spring rods attached to one another.
Figure 7:
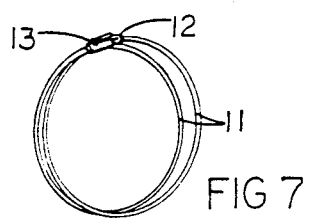
FIG. 7 is a perspective view of the resilient spring rod with opposite ends engaged to one another for storage.
Figure 8:
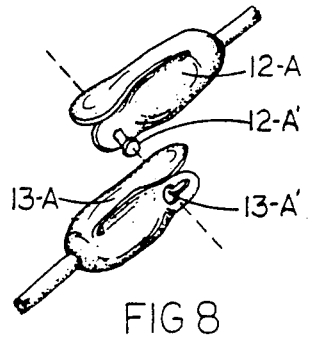
FIG. 8 is a perspective view of an alternative means of engaging the opposite ends of the spring rods.

Turning to FIG. 6, the U-shaped sockets 12 and 13 may be interconnected with one another such that the spring rod 11 may be conveniently and portably rolled up as shown in FIG. 7. In an alternative embodiment shown in FIG. 8, U-shaped sockets 12A and 13A may include an interlocking peg 12A and a receiving slot 13A to maintain the U-shaped sockets 12A and 13A interconnected.

Figure 9:
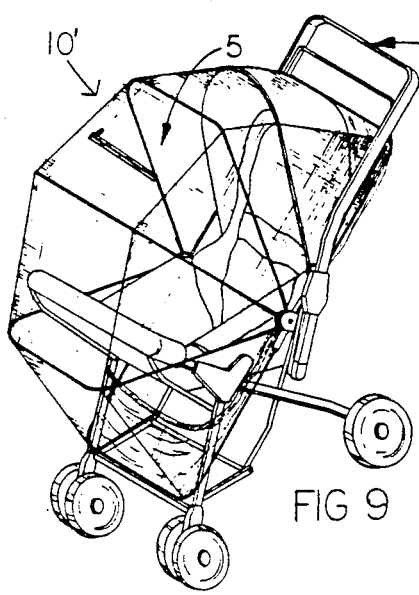
FIG. 9 is a perspective view of a typical stroller fitted with a second embodiment of the insect netting assembly.
Figure 10:
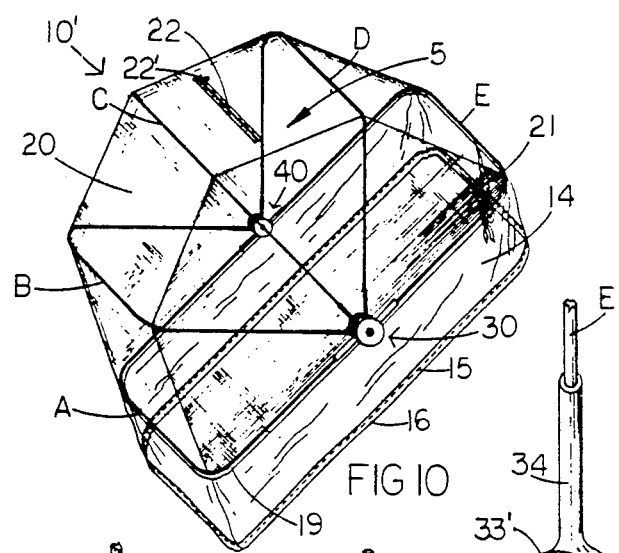
FIG. 10 is a perspective view of the second embodiment of the insect netting in an extended position.
Figure 11:
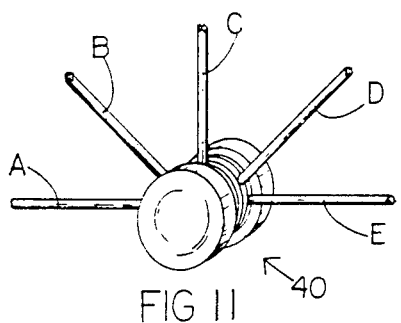
FIG. 11 is a perspective of the circular rib bearing unit.

In FIG. 9, the second embodiment of the insect netting assembly 10' is shown secured to a baby stroller 50. The second embodiment 10' includes a plurality of U-shaped ribs A, B, C, D and E which define the shape of the arched enclosure 5, as detailed in FIG. 10. The U-shaped ribs A, B, C, D and E are attached at their opposite distal ends to a pair of rib bearing units 30 and 40. The rib bearing units 30 and 40 maintain the U-shaped ribs A, B, C, D and E in spaced apart relation.

Figure 12:
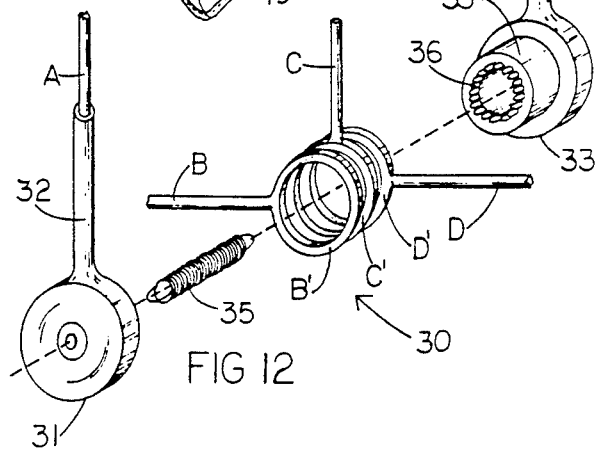
FIG. 12 is an exploded perspective view of the adjustable circular rib bearing unit.
Figure 13:
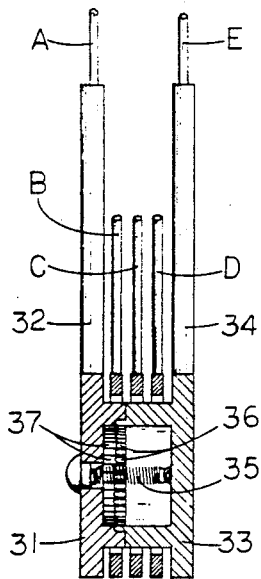
FIG. 13 is a cross-sectional view of the adjustable rib bearing unit.

Detailed in FIGS. 12 and 13, the rib bearings 30 and 40 include a pair of interlocking discs 31 and 33, which are drawn together by a spring 35, and locked in position by tongue and groove connectors 36 and 37. Extending from the interlocking discs 31 and 33 are elongate arms 32 and 34 wherein a distal end of the U-shaped ribs A and E may be snap fitted, correspondingly. The U-shaped rib units B, C, and D include looped distal ends B', C' and D' which are positioned about a protruding portion 33' of interlocking disc 33. Accordingly, the interlocking discs 31 and 33 are drawn towards one another maintaining the U-shaped ribs A, B, C, D and E in a proper fixed position, and when desired, one of the interlocking discs 31 or 33 may be pulled out slightly to allow the arched enclosure to collapse into a portable and storable unit.

Figure 14:
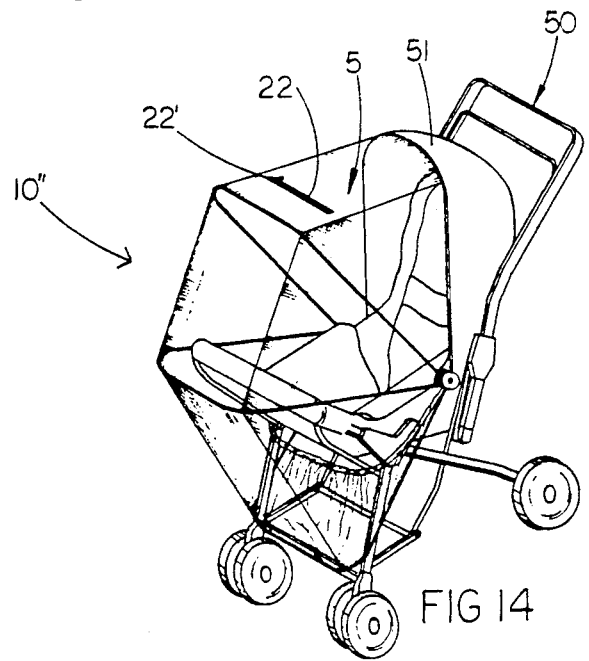
FIG. 14 is a perspective view of a stroller having a third embodiment of the insect netting in an extended position thereover.

Finally, a third embodiment of the portable insect netting 10" is detailed in FIG. 14, wherein the arched enclosure is an integral part of the baby stroller 50 and is attached directly to the baby stroller 50 overhanging awning 51.

Now that the invention has been described, what is claimed is:

1. To be used in combination with a baby stroller; a portable insect netting assembly comprising:
    a collapsible arched enclosure,
    said arched enclosure including a top panel, a pair side panels, and an open bottom,
    said side panels being generally semicircular in shape and including an arched peripheral edge and a bottom edge,
    said top panel being attached to said arched peripheral edge of said pair of side panels at opposite elongate edges of said top panel,
    said top panel and said pair of side panels being made of an open weave fabric.
    collapsible frame means structured and disposed to define said arched enclosure,
    said frame means including a pair of oppositely disposed rib bearing units, each centrally disposed along said bottom edges of said side panels,
    said frame means further including a plurality of U-shaped ribs, all of which are attached, in generally spaced apart relation to one another, at opposite distal ends thereof, to said pair of oppositely disposed rib bearing units, thereby forming a radial support array about said bearing units,
    said ribs including a pair of outermost ribs and a plurality of middle ribs, each of said ribs being foldable toward an adjacently positioned one of said ribs, thereby collapsing the arched enclosure,
    each of said bearing units including two interlocking disks, each of said disks having an elongate arm wherein a distal end of a correspondingly positioned one of said outermost ribs is secured,
    one of said disks including a concentrically disposed protruding portion adapted to be lockingly engaged with a second one of said disks,
    each of said middle ribs including a pair of looped distal ends, each of said looped distal ends being structured and disposed for secure positioning over said protruding portion of one of said disks such that when said disks are interlocked with one another said ribs will remain in a substantially constant orientation unless purposefully collapsed, and
    locking means structured and disposed to interlockingly attach said disks, said locking means including an axially extending spring connected at opposite distal ends thereof to each of said interlocking disks, thereby maintaining said disks in substantially tight interlocking relation.

2. A portable insect netting assembly as recited in claim 1 wherein said assembly may be integrally formed as part of the baby stroller.

3. A portable insect netting assembly as recited in claim 1 further including a surrounding skirt, said surrounding skirt being stitched to said lower edge of said side panels and opposite distal ends of said top panel, and being structured and disposed to be fitted around the baby stroller.

4. A portable insect netting assembly as recited in claim 3 wherein said surrounding skirt includes a strip of elastic material about a lower peripheral edge thereof which functions to secure said enclosure about the baby stroller.

5. A portable insect netting assembly as recited in claim 4 wherein said surrounding skirt is made of a flexible sheet of braided nylon.

6. A portable insect netting assembly as recited in claim 4 wherein said top panel includes a sealable opening, thereby allowing access to an interior of said arched enclosure.

7. A portable insect netting assembly as recited in claim 6 wherein said sealable opening includes a zipper.

* * * * *